UNITED STATES PATENT OFFICE.

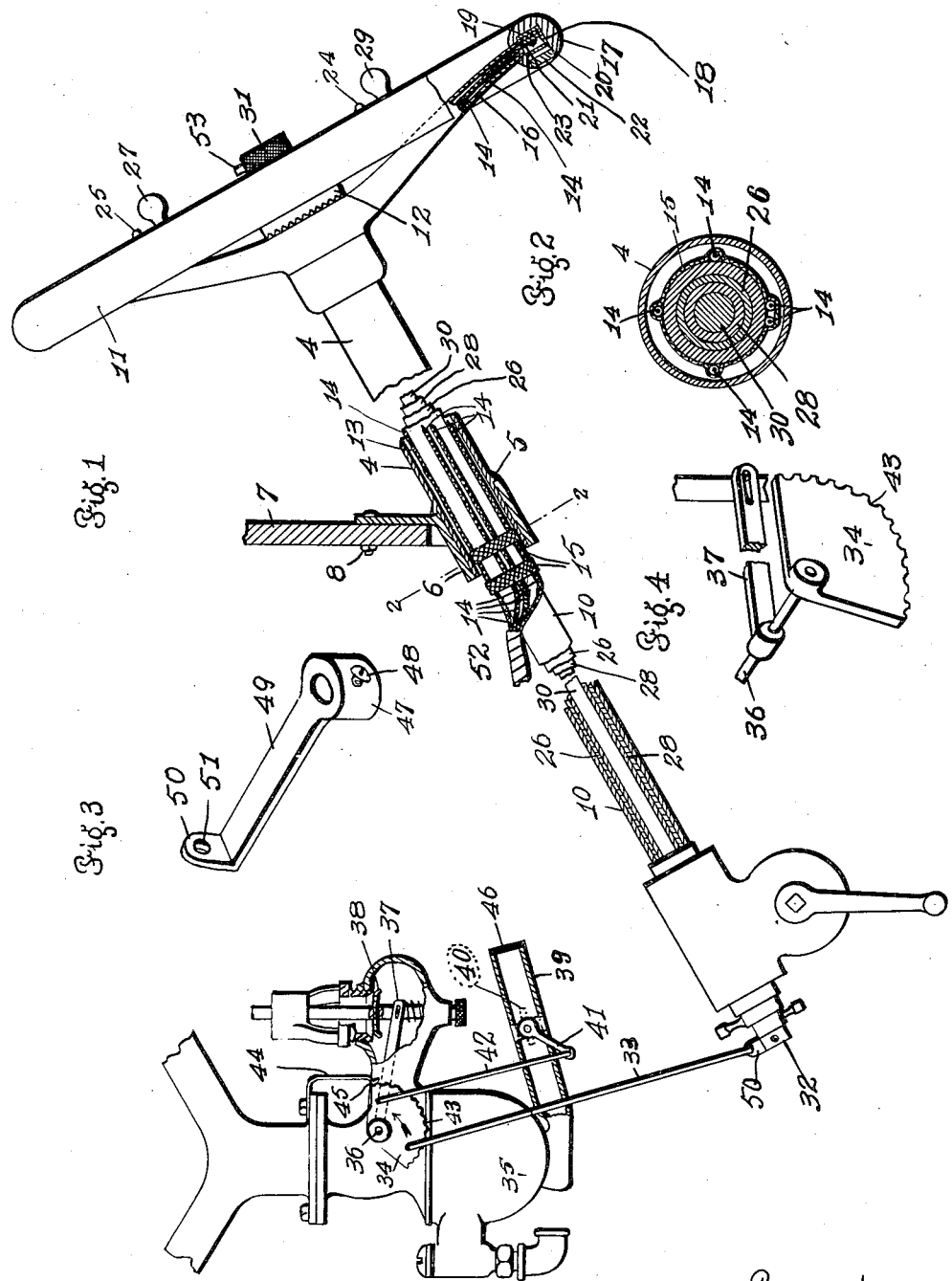

JASPER BLACKBURN, OF WEBSTER GROVES, MISSOURI, ASSIGNOR TO THE BLACKBURN PATENT STEERING WHEEL COMPANY, OF ST. LOUIS, MISSOURI, A CORPORATION OF MISSOURI.

CONTROLLING DEVICE FOR AUTOMOBILES.

1,418,278.  Specification of Letters Patent.  Patented June 6, 1922.

Application filed February 10, 1919. Serial No. 276,147.

*To all whom it may concern:*

Be it known that I, JASPER BLACKBURN, a citizen of the United States, and resident of Webster Groves, St. Louis County, Missouri, have invented certain new and useful Improvements in Controlling Devices for Automobiles, of which the following is a specification containing a full, clear, and exact description, reference being had to the accompanying drawings, forming a part thereof.

My invention relates to certain new and useful improvements in controlling devices for automobiles and has for its primary object a steering mechanism for automobiles in which the air control of the carbureter is manipulated through the steering mechanism. A further object is to provide a controlling device for automobiles whereby the steering mechanism, ignition, lights, signal device, gasoline, spark control and air admission to the carburetor are operated without having to stoop over toward the instrument board.

In the drawings:

Fig. 1 is a view of my device showing an automobile steering wheel, its connection to the carburetor and to the various translating devices.

Fig. 2 is a cross section taken on the line 2—2 of Fig. 1 showing the method of securing the electrical conductors to the steering post.

Fig. 3 is a perspective view of the lever mechanism made use of to operate the air valves, and Fig. 4 is a perspective view of the quadrant and lever for operating the auxiliary air valve.

In the construction of my device, I provide a rotating steering column 4 which is provided with an integral flange 5. This steering column is seated in a socket 6 which is secured to the instrument board 7 of an automobile or motor vehicle by means of bolts 8. The flange 5 contacts with the upper edge of the socket 6.

Within the steering column 4 is located a steering post 10 which is preferably of tubular construction. This post is secured to the steering wheel 11 by means of a toothed sleeve 12. The steering column and post are spaced apart as indicated by the numeral 13 so as to allow electrical conductors 14 to pass between. These electrical conductors 14 are secured to the steering post by means of tape or any other securing means 15.

The spokes of the wheel 11 are made hollow as indicated by the numeral 16 and in these spokes the various conductors 14 are located. The rim 17 of the steering wheel is provided with a channel 18 in which electrical conductors 19 and 20 are located, these conductors being separated by a strip of insulating material 21.

Within the channel 18 are located segments 22 which act against contact points or springs 23, so that when the segment 22 is pressed upwardly, a circuit will be established and the signal device operated. Extending from the upper face of the steering wheel 11 I provide levers or buttons 24 and 25, the buttons or levers being for the ignition and light switches respectively. This electrical connection is also made through the conductors 19 and 20 as has been described in my application bearing Serial No. 273,259.

Secured to the tube 26 is a lever 27 which controls the gasoline supply to the carburetor, the entire mechanism not being shown as the same is old in the art; and secured to the tube 28 is a lever 29 which acts on the spark control, and the quadrant controlling these is not shown as this mechanism is also well known in the construction of automobiles.

Within the tube 28 is a rod or tube 30 having on its upper end a knurled button 31, and on its lower end a lever 32. This lever is connected by means of a rod 33 to a quadrant 34, this quadrant being mounted on the carbureter 35. Attached to the quadrant 34 is a shaft or pin 36 which extends entirely through the carbureter 35, and in the interior of the carbureter and attached to the shaft 36 is mounted a lever 37 which is connected to a spring actuated valve 38, this valve allowing the admission of cold air to the carburetor.

To the bottom of the carbureter 35 is attached a warm air pipe 39, having a butterfly valve 40 located therein. This valve is operated by the lever 41 which lever is attached to the quadrant 34 by means of the rod 42 so that when the cold air valve 38 is opened, the valve 41 is closed, thus regulating the temperature of the air admitted to the carbureter.

Quadrant 34 is provided with a series of recesses or teeth 43 with which a spring 44 contacts. This spring is preferably made in the shape of a leaf spring having an offset 45, which will seat itself in the indentations 43.

The end 46 of the warm air inlet 39 is connected to the exhaust manifold by means of a flexible tube, not shown in the drawings.

The lever 32 is provided with a collar 47 which is secured to the rod 30 by means of a screw 48, or any other suitable means. This collar 47 is provided with a horizontally projecting arm 49 and a vertically projecting portion 50, which is provided with an opening 51 to which the rod 33 is secured.

The operation of my device is as follows: When it is desired to admit warm air to the carburetor, the knob 31 is turned, imparting motion to the lever 49, and thus swinging the segment 34 in the direction indicated by the arrow. This operation will close the auxiliary valve 38 and open the warm air valve 40, the spring 44 holding both valves in position and keeping them against opening or closing which may be caused by the jolting or vibration of the machine.

The electric conduit or conductors extend from the channels in the wheel through the hollow spokes of the wheel passing down through the steering column and after emerging from the sleeve 6 are twisted together and bound with tape as indicated by the numeral 52, and from there passing to the various translating devices.

By this construction the entire controlling mechanism, that is the steering, ignition, lighting, signalling, gasoline control, spark advance and air control are regulated from the steering wheel, and there is no necessity for the driver of a machine to stoop over towards the instrument board to regulate or to operate any one of these different devices.

In the application shown, I have shown my device for use in connection with the carburetor having two air valves, a cold air valve and a warm air valve, but it is obvious that it may be applied to any type of carburetor having one air valve.

I may also construct my device so that the rod 30 may be given a reciprocating movement instead of rotary, and still accomplish the same result.

As previously pointed out, the primary object of this improvement is the control of the air inlet valve of the carburetor by an operating rod or tube located within the steering post or column, which steering post may be enclosed either by a rotating or stationary steering column, and the said rod or tube project through the wheel hub so as to be readily accessible for manipulation. I have provided a button or knob 31 with a projection 53 so as to indicate the position of the air inlet valves, this indicator being set as desired by the person operating the machine.

I believe it to be new in the art to operate the air valve of the carburetor by a rod positioned within the steering post and having one of its ends projecting through the hub of the steering wheel making it readily accessible for manipulation without the necessity of the driver of the vehicle changing the position of his body. Where this valve control is located on the instrument board, the operator must necessarily bend over to reach the same and temporarily concentrate his eyes on the knob for adjusting these valves and take them off of the road, and furthermore by stooping over and maintaining a hold on the wheel with one hand only, the forward movement of the body is liable to turn the steering wheel and force the machine off of the road or out of its path of travel. These objections are overcome by my improvement as the driver can tell by the "feel" when touching the knob just where the valves are set, this being indicated by the position of the projection 53, and it will be unnecessary for him to concentrate his eyes upon the knob and he can keep them upon the road at all times.

Having fully described my invention, what I claim is:—

1. An air controlling device for carburetors comprising a carburetor, a cold air passage and a warm air passage connected thereto, a valve located in each passage, a quadrant mounted on the carburetor, a connection between the quadrant and each of the valves, said connection being so arranged that when one valve is open the other is closed, means carried by the carburetor for holding the quadrant against accidental movement, and means for moving the quadrant so as to operate both valves simultaneously and thereby control the amount and temperature of air admitted to the carburetor.

2. An air controlling device for carburetors, comprising a carburetor, an air passage connected thereto, a shutter located in said passage, a ratchet mounted on said carburetor, a connection between the ratchet and shutter, means carried by the carburetor for holding the ratchet against accidental movement, and means for moving the ratchet so as to operate said valve, and thereby control the amount of air admitted to the carburetor.

In testimony whereof, I have signed my name to this specification, in presence of two subscribing witnesses.

JASPER BLACKBURN.

Witnesses:
EDWARD E. LONGAN,
ELIZABETH CARTALL.